UNITED STATES PATENT OFFICE.

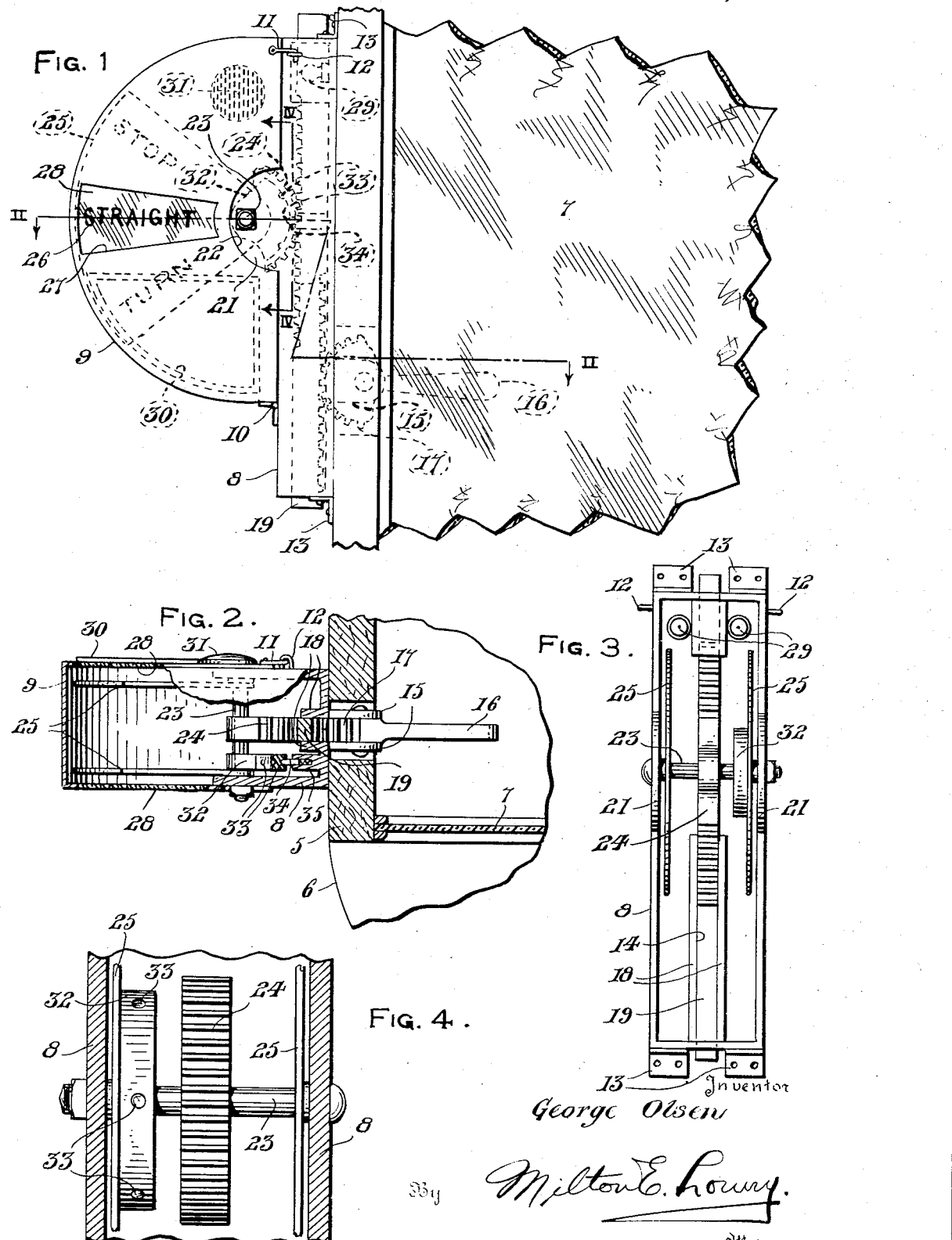

GEORGE OLSEN, OF WASHINGTON, DISTRICT OF COLUMBIA, ASSIGNOR OF ONE-HALF TO JOHN DROTER, OF WASHINGTON, DISTRICT OF COLUMBIA.

DIRECTION INDICATOR FOR MOTOR VEHICLES.

1,403,521.   Specification of Letters Patent.   Patented Jan. 17, 1922.

Application filed July 23, 1921. Serial No. 487,102.

*To all whom it may concern:*

Be it known that I, GEORGE OLSEN, a citizen of the United States of America, residing at Washington, in the District of Columbia, have invented certain new and useful Improvements in Direction Indicators for Motor Vehicles, of which the following is a specification.

This invention relates to certain new and useful improvements in motion and direction indicators for motor vehicles, and has particular reference to the provision of a manually operable signal device of this kind adapted for attachment to the side of an automobile body and including an actuating member within convenient reach of the driver of the automobile.

The primary object of the invention is to generally simplify and improve devices of the present kind.

Another object of the invention is to provide a simple and efficient means under control of the chauffeur of an automobile for indicating to pedestrians and drivers of other vehicles the intention of the chauffeur to deviate from a straight course or to stop so as to avoid accidents otherwise caused from this source.

With the above general objects in view and others that will become apparent as the nature of the invention is better understood, the invention consists in the novel form, combination and arrangement of parts hereinafter more fully described in connection with the accompanying drawings in which like designating characters refer to corresponding parts throughout the several views.

In the drawings,

Figure 1 is a front elevational view of a motion and direction indicator constructed in accordance with the present invention and shown operatively disposed adjacent the windshield of an automobile, a fragment of which is shown, Figure 2 is a horizontal sectional view taken substantially upon line II—II of Figure 1, Figure 3 is an edge elevational view of the device shown in Figure 1 with the cover portion of the casing removed, and Figure 4 is an enlarged vertical sectional view taken substantially upon line IV—IV of Figure 1.

Referring more in detail to the several views, the present device is shown attached to the right hand side of the body 5 of an automobile having a hood 6 and a windshield 7, but it is obvious that the same may be attached to the left hand side of the automobile, should the steering wheel be at the left hand side of the car. The invention includes a casing formed in two sections 8 and 9 preferably hinged together at their lower portions as at 10 so that the section 9 constitutes a cover section which may be swung outwardly and downwardly in order to have access to the interior of said casing for repair and other purposes, the two sections being held together when closed by any suitable form of catch such as the hook 11 carried by the cover section 9 and the eye 12 carried by the section 8. The casing section 8 is preferably of elongated form with a flat side adapted to be secured flatly against the adjacent side of the automobile body in a vertical position by means of brackets 13 or the like at the upper and lower ends thereof. The section 8 is provided with a longitudinal elongated slot in this side of the same as at 14 and coincident with the slot 14 the casing section 8 is provided with inwardly projecting spaced ears 15 to and between which is pivoted a hand lever 16 having a spur segment 17 upon its outer end portion arranged for movement between a pair of inwardly extending guide flanges 18 formed at opposite sides of the slot 14. The flanges 18 have a vertical rack bar 19 slidably disposed therebetween with teeth upon one edge of the same meshing with the segment gear 17, and the upper end of the rack bar 19 is also guided by means of a U-shaped guide 20 provided at the upper end of the casing section 8 as shown clearly in Figure 3. The opposite ends of the casing section 8 may be provided with openings through which the rack bar 19 projects, and said casing section 8 is provided upon its flanges substantially midway between the ends of the same with enlarged portions in the form of ears 21 which fit within corresponding cut outs 22 provided in the flanges of the cover section 9. A transverse shaft 23 is journaled in a horizontal position in the ears 21 and has a segment gear 24 secured thereon in mesh with the teeth upon the outer edge of the rack bar 19, while a pair of segment-shaped indicator plates 25 are also fastened upon the shaft 23 so as to turn therewith adjacent the sides or flanges of the cover section 9, the segment gear 24 being arranged to extend toward the vehicle while the indicator plates 25 are arranged to extend outwardly therefrom so that the indicia 26 upon said segmental indicator plates may be visible through openings 27 provided in the casing section 9. The openings 27 are preferably closed by transparent panels 28 of glass or the like and are of such size as to only expose one of the signals therethrough at a time, the signal "straight" being preferably disposed between the signals "stop" and "turn" and all of said signals being preferably printed or otherwise provided radially on the exposed surfaces of the plates 25. Thus the signals will be simpltaneously displayed to those in the rear of the vehicle as well as approaching pedestrians and drivers and suitable electric lamps 29 may be provided within the casing section 8 so as to insure display of the signals at nighttime.

If desired, the lower portion of the rear side or flange of the casing section 9 may be provided with a mirror as at 30 in which the driver may see the condition of traffic in the rear of the machine which he is driving, while a lens 31 of red colored glass or the like may be provided above the mirror 30 through which the rays of the lamps 29 are visible at night for indicating the same as a tail light, commonly employed upon motor vehicles.

A segment disk 32 having a smooth arcuate edge is secured upon the shaft 23 and is provided with three sockets 33 in its smooth edge arranged for selective reception of a spring pressed detent 34 mounted in a suitable hollow boss 35 provided in the casing section 8, the arrangement of the sockets 33 being such that when the signal "straight" is exposed through the openings 27, the detent 34 will be in engagement with the intermediate socket 33 and thereby serve to hold the signal plates 25 against movement so that accidental displacement of the proper signal will be prevented although manual changing of said signal will be possible, the detent 34 being similarly engaged in the uppermost socket 33 when the signal "turn" is exposed and in the lowermost socket 34 when the signal "stop" is exposed. Obviously, the form and arrangement of the signals and sockets may be varied if found desirable, but the arrangement shown is deemed preferable.

In operation, with the parts disposed as shown in Figure 1 and the word "straight" displayed through the panels 28, should the driver of the vehicle desire to come to a stop and to give warning to that effect to drivers in the rear, the hand lever 16 will be depressed so as to cause the rack bar 19 to move upwardly, thereby rotating the gear 24 and swinging the segments 25 downwardly, at which time the detent 34 will leave the intermediate socket 33 and when the word "stop" is visible through the panels 28 the detent 34 will engage the lowermost socket 33 and thereby hold the plate 35 against swinging accidentally. A reverse of this operation will expose the word "turn" on the plates 25 if the driver wishes to make a turn either to the right or left and with the parts disposed to expose the "turn" signal, the detent 34 will engage the uppermost socket 33 and similarly function.

From the foregoing description, it is believed that the construction and operation as well as the advantages of the present invention will be readily understood and appreciated.

Minor changes may be made without departing from the spirit and scope of the invention as claimed.

What is claimed as new is:

1. In a motion and direction indicator for motor vehicles, a casing having a transverse shaft journaled therein, means to rotate said shaft, said casing being provided with a transparent panel, a segmental indicator plate having radially arranged indicia thereon selectively adapted to be exposed one at a time through said panel, means associated with said shaft for automatically preventing accidental rotation of the same when the indicator plate is set to expose any desired indicia through said panel, said last named means comprising a spring pressed detent carried by the casing, and a disk fixed upon said shaft within the casing having sockets in its edge adapted for selective reception of said detent.

2. A motion and direction indicator for vehicles including a casing, a shaft journaled in the casing, indicator arms fixed to said shaft, a segment disk fixed to said shaft and having spaced sockets in the peripheral walls thereof, and a spring pressed detent carried by the casing selectively engaging said sockets to hold the shaft and indicator arms in set position.

In testimony whereof I affix my signature.

GEORGE OLSEN.